United States Patent
Gao et al.

(10) Patent No.: US 11,601,238 B2
(45) Date of Patent: Mar. 7, 2023

(54) BEAM FAILURE RECOVERY

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/259,698

(22) PCT Filed: Jul. 13, 2018

(86) PCT No.: PCT/CN2018/095687
§ 371 (c)(1),
(2) Date: Jan. 12, 2021

(87) PCT Pub. No.: WO2020/010630
PCT Pub. Date: Jan. 16, 2020

(65) Prior Publication Data
US 2021/0320764 A1    Oct. 14, 2021

(51) Int. Cl.
*H04W 24/10* (2009.01)
*H04L 5/00* (2006.01)
(Continued)

(52) U.S. Cl.
CPC ............ *H04L 5/0032* (2013.01); *H04B 1/74* (2013.01); *H04W 72/044* (2013.01); *H04W 72/085* (2013.01); *H04W 72/14* (2013.01)

(58) Field of Classification Search
CPC ........ H04B 1/74; H04B 7/024; H04B 7/0695; H04L 5/0032; H04W 72/044;
(Continued)

(56) References Cited

U.S. PATENT DOCUMENTS

| 10,587,363 B2 | 3/2020 | Zhou et al. |
| 10,693,712 B2 | 6/2020 | Liou et al. |

(Continued)

FOREIGN PATENT DOCUMENTS

| WO | 2018/083624 A1 | 5/2018 | |
| WO | WO-2018204255 A1 * | 11/2018 | ............ H04B 7/00 |

OTHER PUBLICATIONS

Extended European Search Report dated May 31, 2021 in European Application No. 18926333.8.
(Continued)

*Primary Examiner* — Lan-Huong Truong
(74) *Attorney, Agent, or Firm* — Sughrue Mion, PLLC

(57) ABSTRACT

Embodiments of the present disclosure provide method, device and computer readable medium for beam failure recovery. In example embodiments, a method implemented at a terminal device is provided. The method comprises determining a configuration for receiving Physical Downlink Control Channels (PDCCHs) from a network device, the network device communicating with the terminal device via first and second Transmission and Reception Points (TRPs), wherein the configuration indicates which one of the first and second TRPs are the PDCCHs to be received from. The method further comprises determining whether a beam failure occurs in at least one of the first and second TRPs. In addition, the method further comprises, in response to determining that a beam failure occurs in at least one of the first and second TRPs, performing beam failure recovery (BFR) for the first and second TRPs at least based on the configuration.

4 Claims, 4 Drawing Sheets

(51) Int. Cl.
  *H04B 1/74*      (2006.01)
  *H04W 72/044*    (2023.01)
  *H04W 72/08*     (2009.01)
  *H04W 72/14*     (2009.01)

(58) Field of Classification Search
  CPC ... H04W 72/085; H04W 72/14; H04W 16/26; H04W 16/28; H04W 76/19
  See application file for complete search history.

(56) References Cited

U.S. PATENT DOCUMENTS

| | | | |
|---|---|---|---|
| 10,841,149 B2* | 11/2020 | Nagaraja | H04W 36/0079 |
| 10,911,201 B2 | 2/2021 | Cheng | |
| 2018/0302889 A1* | 10/2018 | Guo | H04B 7/088 |
| 2019/0306765 A1* | 10/2019 | Cirik | H04L 5/0051 |

OTHER PUBLICATIONS

Fujitsu, "Discussion on beam failure recovery procedure", 3GPP TSG RAN WG1 Meeting #89, Hangzhou, P.R. China, May 15-19, 2017, R1-1707255 (4 pages total).

Vivo, "Beam failure recovery procedure", 3GPP TSG RAN WG1 Meeting NR Ad-Hoc#2, Qingdao, P.R. China, Jun. 27-30, 2017, R1-1710400 (5 pages total).

Catt, "PDCCH search space design", 3GPP TSG RAN WG1 Meeting AH_#NR3, Nagoya, Japan, Sep. 18-21, 2017, R1-1715813 (10 pages total).

Ericsson, "On beam indication, measurement, and reporting", 3GPP TSG-RAN WG1 NR Ad Hoc #3, Nagoya, Japan, Sep. 18-21, 2017, R1-1716350 (13 pages total).

U.S. Appl. No. 16/427,371, filed May 31, 2019 (Yu-Hsin Cheng).
U.S. Appl. No. 62/682,332, filed Jun. 8, 2018 (Yu-Hsin Cheng).
U.S. Appl. No. 16/240,030, filed Jan. 4, 2019 (Esmael Dinan).
U.S. Appl. No. 62/626,723, filed Feb. 6, 2018 (Esmael Dinan).
U.S. Appl. No. 16/192,939, filed Nov. 16, 2018 (Jia-hong Liou).
U.S. Appl. No. 62/587,878, filed Nov. 17, 2017 (Jia-hong Liou).

Huawei, Hisilicon, "Solution and TP for multi-TRP PDCCH transmission", 3GPP TSG RAN WG1 Ad Hoc Meeting, R1-1800824, Jan. 22-26, 2018, 5 pgs., Vancouver, Canada.

AT&T, "Mechanisms to recover from beam failure", 3GPP TSG RAN WG1 # 90, R1-1712713, Aug. 21-25, 2017, p. 1-4, Prague, Czech Republic.

Huawei, Hisilicon, "Discussion on the multi-TRP/panel transmission in NR", 3GPP TSG RAN WG1 Meeting #93, R1-1807130, May 21-25, 2018, 7 pgs, Busan, Korea.

CHTTL," Discussion on beam failure recovery", 3GPP TSG RAN WG1 Meeting #89, R1-1708380, May 15-19, 2017, 5 pgs., Hangzhou, P.R. China.

Ericsson, "On robust beam management", 3GPP TSG-RAN WG1 #87ah-NR, R1-1700748, Jan. 16-20, 2017, 3 pgs., Spokane, WA, USA.

Mediatek Inc., "Offline Discussion on Beam Recovery Mechanism", 3GPP TSG RAN WG1 Meeting #90, R1-1715012, Aug. 21-25, 2017, 12pgs., Prague, Czech.

International Search Report for PCT/CN2018/095687 dated, Apr. 17, 2019 (PCT/ISA/210).

Written Opinion of the International Searching Authority for PCT/CN20018/095687 dated, Apr. 17, 2019 (PCT/ISA/237).

Japanese Office Action corresponding to Japanese Patent Application No. 2021-524082 dated Jun. 28, 2022.

Nokia, Nokia Shanghai Bell, Remaining Details on Beam Recovery, 3GPP TSG RAN WG1 #93 R1-1807185, May 11, 2018.

AT & T, On beam recovery for partial and full control channel failure, 3GPP TSG RAN WG1 adhoc_NR_AH_1709 R1 -1716169, Sep. 12, 2017.

Japanese Office Action corresponding to Japanese Patent Application No. 2021-524082 dated Jul. 28, 2022.

* cited by examiner

BEAM FAILURE RECOVERY

CROSS REFERENCE TO RELATED APPLICATIONS

This application is a National Stage of International Application No. PCT/CN2018/095687 filed Jul. 13, 2018.

TECHNICAL FIELD

Embodiments of the present disclosure generally relate to the field of telecommunication, and in particular, to method, device and computer readable medium for beam failure recovery.

BACKGROUND

Due to increased free space path loss in higher frequency band supported in new radio access (NR), channel/signal transmission relies on highly directional links. In other words, directional beam based communication is needed rather than the omni-directional communication in traditional communication systems. Directional links, however, require fine alignment of the transmitter and receiver beams, achieved through a set of operations knowns as beam management. For example, the beam management may generally include operations like beam sweeping, beam measurement, beam determination and beam reporting. These operations can be periodically repeated to update the optimal transmitter and receiver beam pair over time.

A beam failure may occur when the quality of beam pair(s) of an associated control channel falls low enough (for example, comparison with a threshold or time-out of an associated timer). A mechanism to recover from a beam failure may be triggered when the beam failure occurs. The beam failure recovery mechanism on terminal device (such as, user equipment (UE)) side usually includes the following operations: beam failure detection, identification of a new candidate beam, transmission of a beam failure recovery request and monitoring a response for the beam failure recovery request from a network device. For example, the terminal device may monitor a beam failure detection reference signal (RS) to assess if a beam failure occurs. Once the beam failure occurs, the terminal device may monitor beam identification RSs to find a new candidate beam. Once the candidate beam is identified, the terminal device may send a beam failure recovery request carrying information on the identified candidate beam to the network device. The terminal device may monitor a control channel search space to detect a response for the beam failure recovery request from the network device. Once the terminal device receives the beam recovery acknowledgement from the network device, the new beam pair can be considered to be established and the beam failure can be considered to be recovered.

In NR, a network device (such as, a next generation NodeB (gNB)) may be equipped with multiple Transmission and Reception Points (TRPs) or antenna panels. However, in current 3GPP specifications, the beam failure recovery procedure is only adapted to single TRP/panel transmission. For multi-TRP/panel transmission, the traditional beam failure recovery procedure may be not suitable.

SUMMARY

In general, example embodiments of the present disclosure provide method, device and computer readable medium for beam failure recovery.

In a first aspect, there is provided a method implemented at a terminal device.

The method comprises: determining a configuration for receiving Physical Downlink Control Channels (PDCCHs) from a network device, the network device communicating with the terminal device via first and second Transmission and Reception Points (TRPs), wherein the configuration indicates which one of the first and second TRPs are the PDCCHs to be received from; determining whether a beam failure occurs in at least one of the first and second TRPs; and in response to determining that a beam failure occurs in at least one of the first and second TRPs, performing beam failure recovery (BFR) for the first and second TRPs at least based on the configuration.

In a second aspect, there is provided a terminal device. The terminal device comprises a processor and a memory coupled to the processor. The memory stores instructions that when executed by the processor, cause the terminal device to perform actions. The actions comprise: determining a configuration for receiving Physical Downlink Control Channels (PDCCHs) from a network device, the network device communicating with the terminal device via first and second Transmission and Reception Points (TRPs), wherein the configuration indicates which one of the first and second TRPs are the PDCCHs to be received from; determining whether a beam failure occurs in at least one of the first and second TRPs; and in response to determining that a beam failure occurs in at least one of the first and second TRPs, performing beam failure recovery (BFR) for the first and second TRPs at least based on the configuration.

In a third aspect, there is provided a computer readable medium having instructions stored thereon. The instructions, when executed on at least one processor, cause the at least one processor to carry out the method according to the first aspect of the present disclosure.

In a fourth aspect, there is provided a computer program product that is tangibly stored on a computer readable storage medium. The computer program product includes instructions which, when executed on at least one processor, cause the at least one processor to carry out the method according to the first aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
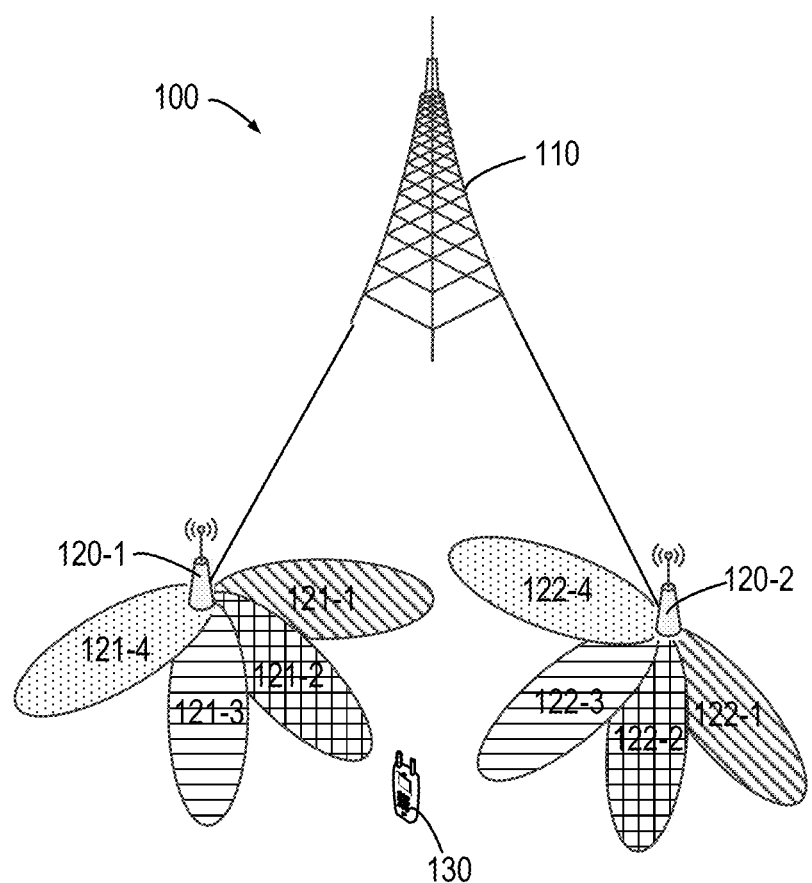
FIG. 1 shows an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As described above, a beam failure may occur when the quality of beam pair(s) of an associated control channel falls low enough (for example, comparison with a predetermined threshold or time-out of an associated timer). A mechanism to recover from a beam failure may be triggered when the beam failure occurs. The beam failure recovery mechanism on terminal device side usually includes the following operations: beam failure detection, identification of a new candidate beam, transmission of a beam failure recovery request and monitoring a response for the beam failure recovery request from a network device.

In NR, a network device (such as, a next generation NodeB (gNB)) may be equipped with multiple Transmission and Reception Points (TRPs) or antenna panels. However, in current 3GPP specifications, the beam failure recovery procedure may be only adapted to single TRP/panel transmission. For multi-TRP/panel transmission, the traditional beam failure recovery procedure may be not suitable.

Embodiments of the present disclosure provide a solution for beam failure recovery, so as to solve the problem above and one or more of other potential problems. The solution for beam failure recovery in accordance with embodiments of the present disclosure can be adapted to multi-TRP/panel transmission. Moreover, embodiments of the present disclosure enable faster beam failure recovery than the traditional beam recovery schemes.

Principle and implementations of the present disclosure will be described in detail below with reference to FIGS. 1-6.

FIG. 1 illustrates an example communication network 100 in which embodiments of the present disclosure can be implemented. As shown in FIG. 1, the network 100 includes a network device 110, which is coupled with two TRPs/panels 120-1 and 120-2 (collectively referred to as TRPs 120 or individually referred to as TRP 120). The network 100 also includes a terminal device 130 served by the network device 110. It is to be understood that the number of network devices, terminal devices and TRPs as shown in FIG. 1 is only for the purpose of illustration without suggesting any limitations. The network 200 may include any suitable number of devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 220.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like.

As used herein, the term "TRP" refers to an antenna array (with one or more antenna elements) available to the network device located at a specific geographical location. For example, a network device may be coupled with multiple TRPs in different geographical locations to achieve better coverage.

As shown in FIG. 1, the network device 110 may communicate with the terminal device 130 via the TRPs 120-1 and 120-2. In the following text, the TRP 120-1 may be also referred to as the first TRP, while the TRP 120-2 may be also referred to as the second TRP. Each of the TRPs 120 may provide a plurality of beams for communication with the terminal device 130. For example, the TRP 120-1 may include four beams 121-1, 121-2, 121-3, and 121-4 (collectively referred to as "beams 121" or individually referred to as "beam 121"), while the TRP 120-2 may also include four beams 122-1, 122-2, 122-3 and 122-4 (collectively referred to as beams 122 or individually referred to as beam 122). It is to be understood that the number of beams as shown in FIG. 1 is only for the purpose of illustration without suggesting any limitations. The TRP 120 may provide any suitable number of beams adapted for implementing embodiments of the present disclosure.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some embodiments, a beam failure may occur if the network device 110 is no longer able to reach the terminal device 130 via a control channel (such as, PDCCH) due to incorrect adjustment of the beams, blockage effect, movement of the terminal device, or some other reasons. For example, the terminal device 130 may detect this situation by estimating the quality of a hypothetical PDCCH reception transmitted over a beam (for example, a beam from the TRP 120-1 or 120-2) the network device 110 would use to reach the terminal device 130. To perform beam failure detection, the terminal device 130 may estimate the quality of a hypothetical PDCCH reception based on reception of a certain reference signal (RS). In the following text, this reference signal may also be referred to as "beam failure detection RS" or "RS for beam failure detection". Examples of the beam failure detection RS may include but not limited to periodic Channel State Information-Reference Signal (CSI-RS), synchronization signal block (SSB), or a combination thereof.

Figure 2:
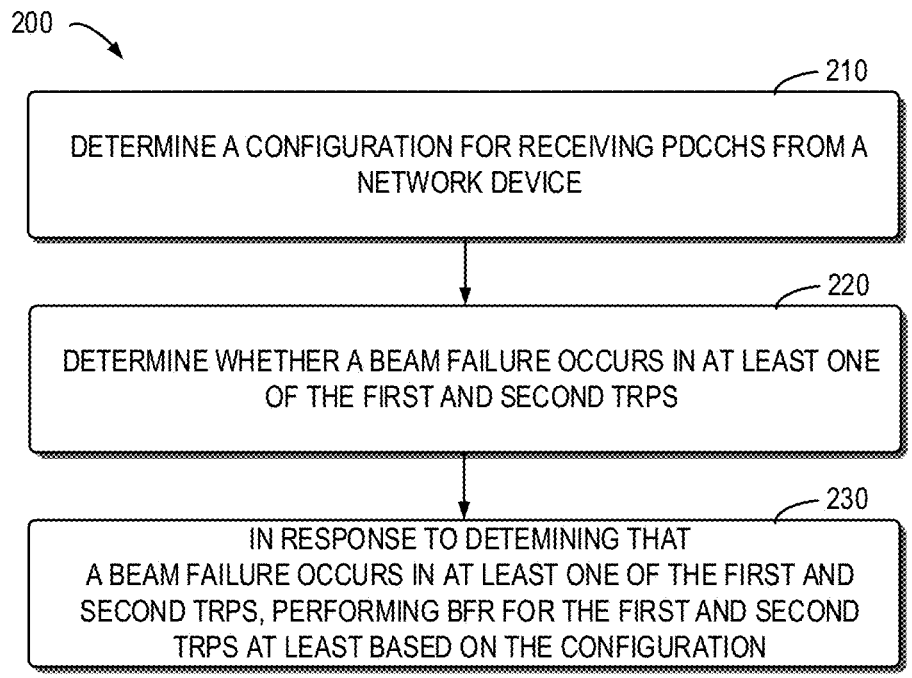
FIG. 2 shows a flowchart of an example method for multi-TRP beam failure recovery in accordance with some embodiments of the present disclosure.

In some embodiments, in response to a beam failure being detected by the terminal device 130, a beam failure recovery procedure for multi-TRP transmission may be performed. FIG. 2 illustrates a flowchart of an example method 200 for multi-TRP beam failure recovery in accordance with some embodiments of the present disclosure. The method 200 can be implemented at the terminal device 130 shown in FIG. 1. For the purpose of discussion, the method 200 will be described with reference to FIG. 1. It is to be understood that the method 200 may include additional acts not shown and/or may omit some shown acts, and the scope of the present disclosure is not limited in this regard.

At block 210, the terminal device 130 determines a configuration for receiving PDCCHs from the network device 110. For example, as shown in FIG. 1, the network device 110 may communicate with the terminal device 130 via the first TRP 120-1 and the second TRP 120-2. In some embodiments, the first TRP 120-1 and the second TRP 120-2 may be included in a same serving cell provided by the network device 110. In addition, the first TRP 120-1 and the second TRP 120-2 may be associated with a same activated bandwidth part (BWP). In some embodiments, the configuration may indicate which one of the TRPs 120 the PDCCHs come from. In some embodiments, for different configurations of PDCCH transmission, BFR procedures may be different.

In some embodiments, for example, the configuration may indicate that the PDCCHs all come from the first TRP 120-1 but Physical Downlink Shared Channels (PDSCHs) may come from the first TRP 120-1 and the second TRP 120-2. That is, in this case, a control channel search space for detecting PDCCHs may be configured for the TRP 120-1 instead of the TRP 120-2. In NR, the control channel search space for detecting PDCCHs is referred to as a "control channel resource set (CORESET)", which corresponds to a group of control channel resources. A PDCCH may be transmitted over one or more control channel resources in the CORESET. In some embodiments, in this case, a CORESET may only be configured for the first TRP 120-1, instead of the second TRP 120-2.

Figure 3:
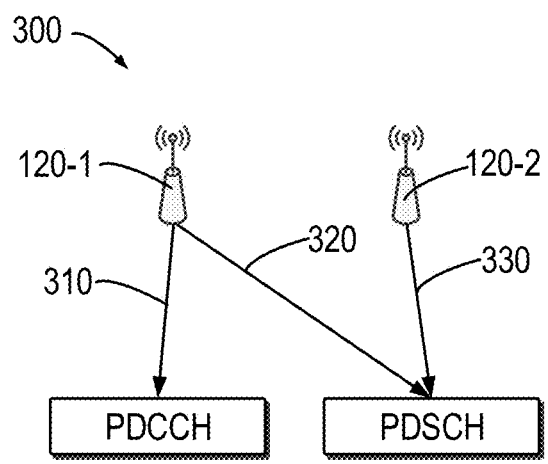
FIG. 3 shows an example scenario of multi-TRP transmission in accordance with some embodiments of the present disclosure.

FIG. 3 shows an example scenario 300 of multi-TRP transmission in accordance with some embodiments of the present disclosure. As shown in FIG. 3, PDSCHs are from both of the first TRP 120-1 and the second TRP 120-2, while PDCCHs are only from the TRP 120-1. In particular, the first TRP 120-1 may provide at least a beam 310 for PDCCH transmission (also referred to as a "first beam") and a beam 320 for PDSCH transmission. For example, the beam 310 or 320 can be any of the beams 121 as shown in FIG. 1. The second TRP 120-1 may provide at least a beam 330 for PDSCH transmission (also referred to as a "second beam"). For example, the beam 330 can be any of the beams 122 as shown in FIG. 1.

Alternative, in some embodiments, the configuration may indicate that the PDCCHs are to be received from both of the first TRP 120-1 and the second TRP 120-2. That is, in this case, one or more CORESETs may be configured for both of the TRP 120-1 and the second TRP 120-2. In some embodiments, different CORESETs may be configured with different identifiers (IDs). For example, CORESET #0 is a CORESET configured by PBCH, which provides frequency location, bandwidth and duration information for PDCCH search space monitoring. In some embodiments, CORESET #0 may be configured to only one TRP, for example, any of the first TRP 120-1 and the second TRP 120-2.

Figure 4:
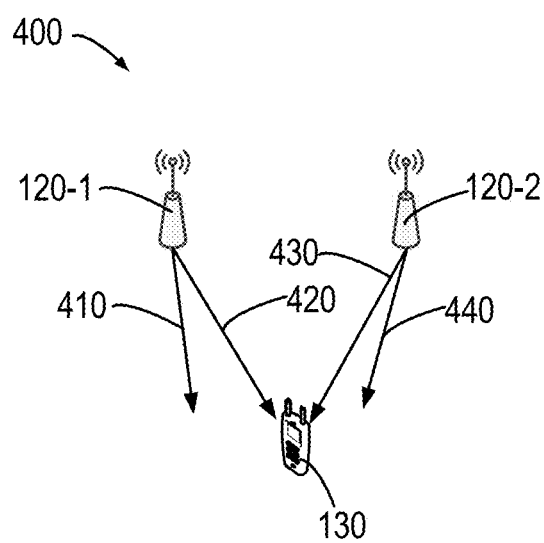
FIG. 4 shows an example scenario of multi-TRP transmission in accordance with some embodiments of the present disclosure.

FIG. 4 shows an example scenario 400 of multi-TRP transmission in accordance with some embodiments of the present disclosure. As shown in FIG. 4, PDSCHs are from both of the first TRP 120-1 and the second TRP 120-2, while PDCCHs are also from both of the first TRP 120-1 and the second TRP 120-2. In particular, the first TRP 120-1 may provide at least a beam 410 for PDCCH transmission and a beam 420 for PDSCH transmission. For example, the beam 410 or 420 can be any of the beams 121 as shown in FIG. 1. The second TRP 120-1 may provide at least a beam 430 for PDSCH transmission and a beam 440 for PDCCH transmission. For example, the beam 430 or 440 can be any of the beams 122 as shown in FIG. 1.

Referring back to FIG. 2, at block 220, the terminal device 130 determines whether a beam failure occurs in at least one of the first and second TRPs 120. In response to determining that a beam failure occurs in at least one of the first and second TRPs 120, at block 230, the terminal device 130 performs BFR for the first and second TRPs 120 at least based on the determined configuration for PDCCH transmission.

In some embodiments, as shown in FIG. 3, the PDCCHs may all come from the first TRP 120-1 but the PDSCHs may come from both of the first TRP 120-1 and the second TRP 120-2. That is, in this case, a CORESET may only be configured for the first TRP 120-1, instead of the second TRP 120-2. In some embodiments, a set of RSs may be used for beam failure detection by the terminal device 130. For example, the set of RSs may be transmitted via the first TRP 120-1 (such as, the beam 310) to the terminal device 130.

In some embodiments, a higher layer parameter about beam failure detection resources (for example, known as "failureDectctionResource") can be configured to the terminal device 130, which may indicate a set of beam failure detection RSs. In this case, the terminal device 130 may determine the set of RSs for beam failure detection based on the higher layer parameter.

Alternatively, in some other embodiments, in response to the higher layer parameter about beam failure detection resources being not configured to the terminal device 130, RSs with quasi co-location (QCL) type D contained in Transmission Configuration Indicator (TCI) configured for PDCCH may be used by the terminal device 130 for beam failure detection. For example, the terminal device 130 may be configured with a number of TCI-States by higher layer signaling to decode a PDSCH according to a detected PDCCH with downlink control information (DCI) intended for the terminal device and the given serving cell, where the number of TCI-States may depend on capability of the terminal device 130. Each of the configured TCI states may include a respective RS set (for example, known as "TCI-RS-SetConfig"), which may contain parameters for configuring quasi co-location (QCL) relationship between the reference signals in the RS set and the demodulation reference signal (DMRS) port group of the PDSCH. The RS set may contain a reference to either one or two downlink RSs and an associated quasi co-location type (QCL-Type) for each one configured by the higher layer parameter QCL-Type. In some embodiments, if the higher layer parameter failureDectctionResource is not configured to the terminal device 130, the terminal device 130 may use the RSs with QCL type D in the TCI state configured for PDCCH to detect a beam failure.

In some embodiments, the terminal device 130 may determine radio link quality associated with the beam 310 by measuring the determined set of RSs from the first TRP 120-1. In response to the radio link quality being below a predetermined threshold, the terminal device 130 may determine that the beam 310 is failed.

In some embodiments, if the beam 310 from the TRP 120-1 for PDCCH transmission is determined to be failed but the beam 330 from the TRP 120-2 for PDSCH transmission is determined to be available, the terminal device 130 may send a beam changing request to the network device 110, such that PDCCH transmission can be switched from the beam 310 to the beam 330 by the network device 110.

In some embodiments, the beam changing request may be transmitted via Physical Random Access Channel (PRACH) or Physical Uplink Control Channel (PUCCH). In some embodiments, the beam changing request may be transmitted using a specific resource, such as based on a specific preamble index or sequence. In some embodiments, the beam changing request may be transmitted like an uplink scheduling request, since the network device 110 only needs to detect occurrence of the beam changing request, without conducting the whole random access procedure. In some embodiments, the beam changing request may be transmitted via the second TRP 120-2 to the network device 110.

Figure 5:
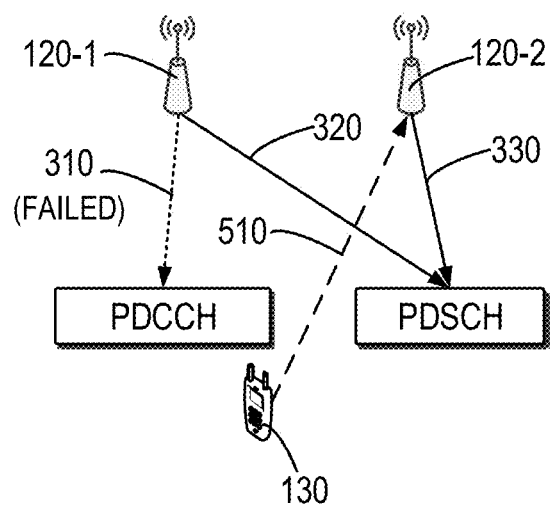
FIG. 5 shows an example of multi-TRP beam failure recovery in accordance with some embodiments of the present disclosure.

FIG. 5 shows an example of such embodiments. As shown in FIG. 5, the beam 310 from the TRP 120-1 for PDCCH transmission is failed but the beam 330 from the TRP 120-2 for PDSCH transmission is available. The terminal device 130 may send a beam changing request 510 to the network device 110 via the second TRP 120-2.

In some embodiments, in response to receiving the beam changing request (for example, the beam changing request 510 as shown in FIG. 5) from the terminal device 130, the network device 110 may configure the TCI state for the CORESET (for example, the CORESET configured for the first TRP 120-1 previously) to the beam 330 from the TRP 120-2. In some embodiments, the network device 110 may configure the TCI state for the CORESET to the beam 330 from the TRP 120-2 in MAC CE activation. In this way, PDCCH transmission can be switched from the failed beam 310 from the TRP 120-1 to the beam 330 from the TRP 120-2.

In some embodiments, in response to the beam changing request being sent to the network device 110, the terminal device 130 may monitor the CORESET to detect PDCCHs from the second TRP 120-2. In some embodiments, if multi-TRP measurement/transmission is enabled, a specific resource may be configured for transmission of a RS via the second TRP 120-2. The terminal device 130 may determine the beam 330 from the TRP 120-2 for PDCCH transmission by measuring the RS from the second TRP 120-2.

In some embodiments, as shown in FIG. 4, the PDCCHs may come from both of the first TRP 120-1 and the second TRP 120-2, while the PDSCHs may also come from both of the first TRP 120-1 and the second TRP 120-2. That is, in this case, one or more CORESETs may be configured for both of the TRP 120-1 and the second TRP 120-2. In some embodiments, different CORESETs may be configured with different identifiers (IDs). For example, CORESET #0 is a CORESET configured by PBCH, which provides frequency location, bandwidth and duration information for PDCCH search space monitoring. In some embodiments, CORESET #0 may be configured to only one TRP, for example, any of the first TRP 120-1 and the second TRP 120-2.

In some embodiments, in this case, if the higher layer parameter about beam failure detection resources is configured to the terminal device 130, the set of RSs for beam failure detection may include two RSs, one for the first TRP 120-1 (which may be referred to as "RS1" in the following text) and the other for the second TRP 120-2 (which may be referred to as "RS2" in the following text).

In some embodiments, the terminal device 130 may determine first radio link quality associated with the first TRP 120-1 by measuring RS1 from the first TRP 120-1. In response to the first radio link quality being below a predetermined threshold, the terminal device 130 may determine that a beam failure occurs in the first TRP 120-1. In some embodiments, the terminal device 130 may determine second radio link quality associated with the second TRP 120-2 by measuring RS2 from the second TRP 120-2. In response to the second radio link quality being below the predetermined threshold, the terminal device 130 may determine that a beam failure occurs in the second TRP 120-2.

In some embodiments, in response to determining that a beam failure occurs in the first TRP 120-1 instead of the second TRP 120-2, the terminal device 130 may indicate the first radio link quality associated with the first TRP 120-1 to the second TRP 120-2. In this way, the first radio link quality can be known by the second TRP 120-2.

In some embodiments, two sets of candidate beams (such as, two set of beam identification RSs) may be configured for the BFR via higher layer signaling, which may be mapped to the two beam failure detection RSs respectively. For example, a first set of candidate beams (such as, a first set of beam identification RSs) may correspond to RS1, while a second set of candidate beams (such as, a second set of beam identification RSs) may correspond to RS2. In some embodiments, in response to determining that a beam failure occurs in the first TRP 120-1 instead of the second TRP 120-2, the terminal device 130 may determine whether the first set of candidate beams from the network device 110 are available (for example, by measuring the first set of beam identification RSs). If the first set of candidate beams is detected by the terminal device 130, the terminal device 130 may initiate a contention free random access (CFRA) procedure for the BFR based on the first set of candidate beams.

In some embodiments, two sets of beam failure detection RSs and two sets of beam identification RSs may be configured to the terminal device 130. For example, the two sets of beam failure detection RSs may include a first set of beam failure detection RSs (represented as $S_1$) and a second set of beam failure detection RSs (represented as $S_2$). $S_1$ may include RSs $\{S_{1\_1}, S_{1\_2} \ldots S_{1\_N}\}$, where N is an integer and N>=0. $S_2$ may include RSs $\{S_{2\_1}, S_{2\_2} \ldots S_{2\_M}\}$, where M is an integer and M>=0. The two sets of beam identification RSs may include a first set of beam identification RSs (represented as $R_1$) and a second set of beam identification RSs (represented as $R_2$). $R_1$ may include RSs $\{R_{1\_1}, R_{1\_2} \ldots R_{1\_P}\}$, where P is an integer and P>=0. $R_2$ may include RSs $\{R_{2\_1}, R_{2\_2} \ldots R_{2\_Q}\}$, where Q is an integer and Q>=0. For example, the first set of beam failure detection RSs $S_1$ may correspond to the first set of beam identification RSs $R_1$, while the second set of beam failure detection RSs $S_2$ may correspond to the second set of beam identification RSs $R_2$.

In some embodiments, if all of the RSs in one of the first and second sets of beam failure detection RSs are detected to be failed (for example, respective Block Error Rates exceeding a predetermined threshold), a new candidate beam may be identified from one of the first and second set of beam identification RSs correspond to the one of the first and second sets of beam failure detection RSs. For example, in some embodiments, if all of the RSs in the first set of beam failure detection RSs $S_1$ are detected to be failed, a new candidate beam may be identified from the first set of beam identification RSs $R_1$. In this event, the index of the RS corresponding to the new candidate beam from the first set of beam identification RSs $R_1$ may be indicated to the network device 110 by the terminal device 130. For example, the number of bits for indicating the index of the RS may be ceil ($\log_2$ (P)). In some embodiments, if all of the RSs in the second set of beam failure detection RSs $S_2$ are detected to be failed, a new candidate beam may be identified from the second set of beam identification RSs $R_2$. In this event, the index of the RS corresponding to the new candidate beam from the second set of beam identification RSs $R_2$ may be indicated to the network device 110 by the terminal device 130. For example, the number of bits for indicating the index of the RS may be ceil (loge (Q)).

Alternatively, in some embodiments, two sets of candidate beams (such as, two set of beam identification RSs) may be configured for the BFR via higher layer signaling, which may be mapped to the two beam failure detection RSs respectively. For example, a first set of candidate beams (such as, a first set of beam identification RSs) may correspond to RS1, while a second set of candidate beams (such as, a second set of beam identification RSs) may correspond to RS2. In some embodiments, in response to determining that a beam failure occurs in the first TRP 120-1 instead of the second TRP 120-2, the terminal device 130 may determine whether the first set of candidate beams from the network device 110 are available (for example, by measuring the first set of beam identification RSs). If the first set of candidate beams are detected by the terminal device 130, the terminal device 130 may indicate information on the first set of candidate beams (such as, beam indices) to the second TRP 120-2, without initiating the CFRA-based BFR.

In some embodiments, as shown in FIG. 4, the PDCCHs may come from both of the first TRP 120-1 and the second TRP 120-2, while the PDSCHs may also come from both of the first TRP 120-1 and the second TRP 120-2. That is, in this case, one or more CORESETs may be configured for both of the TRP 120-1 and the second TRP 120-2. In some embodiments, different CORESETs may be configured with different IDs. For example, CORESET #0 is a CORESET configured by PBCH, which provides frequency location, bandwidth and duration information for PDCCH search space monitoring. In some embodiments, CORESET #0 may be configured to only one TRP, for example, any of the first TRP 120-1 and the second TRP 120-2. In some embodiments, in this case, if the higher layer parameter about beam failure detection resources is configured to the terminal device 130, the set of RSs for beam failure detection may include two RSs, one for the first TRP 120-1 (for example, RS1) and the other for the second TRP 120-2 (for example, RS2).

In some embodiments, the terminal device 130 may determine first radio link quality associated with the first TRP 120-1 by measuring RS1 from the first TRP 120-1. In response to the first radio link quality being below a predetermined threshold, the terminal device 130 may determine that a beam failure occurs in the first TRP 120-1. In some embodiments, the terminal device 130 may determine second radio link quality associated with the second TRP 120-2 by measuring RS2 from the second TRP 120-2. In response to the second radio link quality being below the predetermined threshold, the terminal device 130 may determine that a beam failure occurs in the second TRP 120-2.

In some embodiments, in response to determining that beam failures occur in both of the first TRP 120-1 and the second TRP 120-2, the normal beam failure recovery procedure can be performed.

In some embodiments, as shown in FIG. 4, the PDCCHs may come from both of the first TRP 120-1 and the second TRP 120-2. For example, in this case, two different CORESETs may be configured for the TRP 120-1 and the second TRP 120-2, respectively. In some embodiments, the two different CORESETs may be monitored by the terminal device 130 on a same slot to detect PDCCHs. In some embodiments, different CORESETs may be configured with different IDs. For example, CORESET #M may be configured for the first TRP 120-1, while CORESET #N may be configured for the first TRP 120-2, where M>0 and N>0. CORESET #0 may be a CORESET configured by PBCH, which provides frequency location, bandwidth and duration information for PDCCH search space monitoring. In some embodiments, CORESET #0 may be configured to only one TRP, for example, any of the first TRP 120-1 and the second TRP 120-2.

In some embodiments, PDCCHs may be scheduled on at least one of CORESET #0 and CORESET #M. In this case, if the PDCCH scheduling offset is below a predetermined threshold, and if CORESET #0 and CORESET #M are configured in the same slot, a beam associated with the TCI state for CORESET #0 can be determined as a default beam for detecting PDCCHs. Alternatively, in some other embodiments, PDCCHs may be scheduled on CORESET #N. In this case, if the PDCCH scheduling offset is below the predetermined threshold, a beam associated with the TCI state for CORESET #N can be determined as the default beam for detecting PDCCHs.

It can be seen that, embodiments of the present disclosure provide a solution for multi-TRP beam failure recovery. The solution for beam failure recovery in accordance with embodiments of the present disclosure can be adapted to multi-TRP/panel transmission in NR. Moreover, embodiments of the present disclosure enable faster beam failure recovery than the traditional beam recovery schemes.

Figure 6:
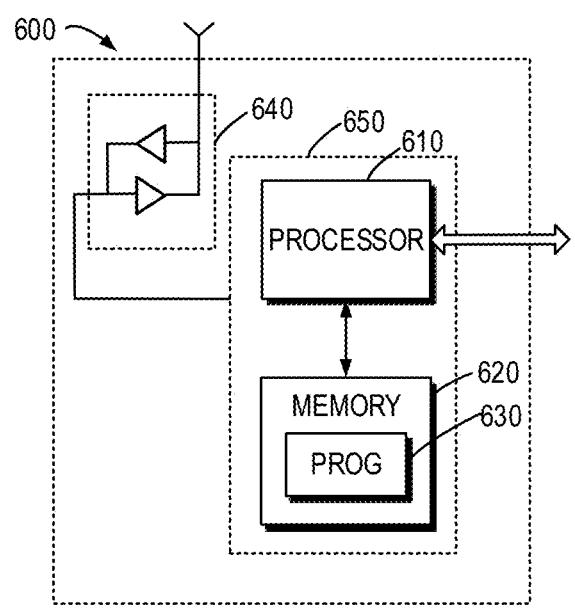
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the network device 110 or the terminal device 120 as shown in FIG. 1. Accordingly, the device 600 can be implemented at or as at least a part of the network device 110 or the terminal device 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630.

The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, $S_1$ interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 2 to 5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by the terminal device, the method comprising:
   receiving, from a first transmission and reception point (TRP), a first Physical Downlink Control Channel (PDCCH) using a resource of a first Control Resource Set (CORESET); and
   receiving, from a second TRP, a second PDCCH using a resource of a second CORESET,
   wherein the first CORESET and the second CORESET are configured for a Bandwidth part (BWP) of a cell,
   wherein both of the first TRP and the second TRP corresponds to the cell,
   wherein a first set of reference signal (RS) resource configuration indexes corresponds to the first CORESET,
   wherein a second set of RS resource configuration indexes corresponds to the second CORESET, and
   wherein the method further comprises transmitting, if a beam failure is detected based on a comparison between a threshold and radio link quality for a RS resource configuration in the first set and the second set, a RS resource configuration index corresponding to a new beam candidate from a third set of RS resource configuration indexes for beam candidates, the third set being provided for the BWP of the cell.

2. The method according to claim 1, wherein
   the beam failure is detected when the radio link quality for all corresponding RS resource configurations in the first set and the second set is below a predetermined threshold.

3. The method according to claim 1, wherein
   the first CORESET is configured for the first TRP, and the second CORESET is configured for the second TRP.

4. A terminal device comprising:
   a receiver configured to receive, from a first transmission and reception point (TRP), a first Physical Downlink Control Channel (PDCCH) using a resource of a first Control Resource Set (CORESET) and receive, from a second TRP, a second PDCCH using a resource of a second CORESET,
   wherein the first CORESET and the second CORESET are configured for a Bandwidth part (BWP) of a cell,
   wherein both of the first TRP and the second TRP corresponds to the cell,
   wherein a first set of reference signal (RS) resource configuration indexes corresponds to the first CORESET,
   wherein a second set of RS resource configuration indexes corresponds to the second CORESET, and
   wherein the terminal device further comprises a transmitter configured to transmit, if a beam failure is detected based on a comparison between a threshold and radio link quality for a RS resource configuration in the first set and the second set, a RS resource configuration index corresponding to a new beam candidate from a third set of RS resource configuration indexes for beam candidates, the third set being provided for the BWP of the cell.

* * * * *